United States Patent [19]

Zecher et al.

[11] Patent Number: 4,792,590

[45] Date of Patent: Dec. 20, 1988

[54] ALIPHATIC-AROMATIC POLYAMIDIMIDES CONTAINING POLYAMIDES

[75] Inventors: Wilfried Zecher, Leverkusen; Klaus Reinking, Wermelskirchen, both of Fed. Rep. of Germany

[73] Assignee: Bayer Akteingesellschaft, Leverkusen, Fed. Rep. of Germany

[21] Appl. No.: 48,803

[22] Filed: Jul. 2, 1987

Related U.S. Application Data

[63] Continuation of Ser. No. 766,501, Aug. 19, 1985, abandoned.

[30] Foreign Application Priority Data

Aug. 30, 1984 [DE] Fed. Rep. of Germany ....... 3431859

[51] Int. Cl.$^4$ ............................................. C08L 77/00
[52] U.S. Cl. .................................. 525/424; 525/436; 525/432; 524/589; 524/602
[58] Field of Search ........................ 525/424, 436, 432

[56] References Cited

FOREIGN PATENT DOCUMENTS 0097434  1/1984  European Pat. Off. .
8206027 12/1982  France .
2039931  8/1980  United Kingdom .

Primary Examiner—John C. Bleutge
Assistant Examiner—A. Carrillo
Attorney, Agent, or Firm—Connolly & Hutz

[57] ABSTRACT

This invention relates to the use of mixtures of aliphatic-aromatic polyamidimides and polyamides.

19 Claims, No Drawings

ALIPHATIC-AROMATIC POLYAMIDIMIDES CONTAINING POLYAMIDES

This application is a continuation of application Ser. No. 766,501 filed Aug. 19, 1985, now abandoned.

This invention relates to the use of mixtures of aliphatic-aromatic polyamidimides and polyamides. It is known that aliphatic-aromatic polyamidimides (also known as polyamideimides) are obtained when polyisocyanates are reacted with cyclic polycarboxylic acid anhydrides and lactams (DE-AS No. 1 770 202) or polyamides (DE-AS No. 1 956 612).

The polymers are distinguished by their advantageous properties, such as high softening temperatures and good abrasion resistance, and may be used, for example, as high temperature resistant coatings in the field of electrical insulating lacquers.

It has now been found that mixtures composed of 10 to 99.8% by weight, preferably 99.8 to 92 or 80 to 20% by weight, of aliphatic-aromatic polyamidimides obtained from the condensation of organic polyisocyanates such as aliphatic, aliphatic-aromatic or aromatic diisocyanates with cyclic polycarboxylic acid anhydrides and lactams or polyamides at temperatures from 0° to 400° C. and optionally in a solvent and 0.2 to 90% by weight, preferably 0.2 to 8 or 20 to 80% by weight of a polyamide are distinguished by distinct advantages compared with the pure components.

It has also been found that these polymers may be obtained, for example, by preparing the polyamidimide in, for example, a phenolic solvent and then adding the polyamide and concentrating the resulting mixture in an evaporation extruder at temperatures of from 250° to 400° C., optionally under vacuum, and then optionally carrying out an after-condensation.

The high viscosity of the aromatic-aliphatic polyamidimide melts can be sufficiently lowered by the addition of only 0.2 to 8% by weight of polyamides to enable even complicated injection moulded parts to be produced from them without significantly altering the advantageous properties of the polyamidimides.

At the same time, certain properties of the polyamides which are found to be disadvantageous can be significantly improved by the addition of 20 to 80% by weight of the aromatic-aliphatic polyamidimides.

For example, the water absorption of polyamides in a moist atmosphere, in particular in a tropical climate (40° C., 92% relative humidity) or in water can be reduced by mixing the polyamides with aromatic-aliphatic polyamidimides in the above mentioned concentrations.

The low mechanical load-bearing capacity under heat of partially crystalline polyamides such as Polyamide 6 and Polyamide 66 can be considerably improved by the addition of aromatic-aliphatic polyamidimides in the above concentrations.

The polyamides used according to the invention may be compounds which available commercially or obtainable by known processes such as polymerisation or polycondensation e.g. polycapronamide (Nylon 6), polyundecanoic acid amide, polydodecanoic acid amide and polyamides of dicarboxylic acids such as adipic acid, sebacic acid, oxalic acid, dibutylmalonic acid, isophthalic acid and terephthalic acid with diamines such as ethylene diamine, hexamethylene diamine, nona-methylene diamines, 1,6-diamino-2,2,4-trimethylhexane, decamethylene diamine, 4,4'-diamino-dicyclohexylamine and m- and p-phenylene diamine, e.g. polyhexamethylene adipamide (Nylon 66), polyhexamethylene isophthalamide and poly-2,2,4-trimethylhexamethylene-terephthalamide. Polycapronamide (Nylon 6) is particularly preferred.

The preparation of the polyamidimides used according to the invention by the condensation of polyisocyanates with cyclic polycarboxylic anhydrides and lactams or polyamides has been described, for example, in DE-AS No. 1 770 202 and 1 956 512.

The polyisocyanates used for the preparation of the polyamidimides according to the invention are advantageously of the kind described, for example, in DE-OS No. 1 770 202.

The following are particularly preferred: Phosgenated condensates of aniline and formaldehyde having polyphenylenemethylene structures, commercial mixtures of tolylene diisocyanates, m-phenylenediisocyanate and symmetric compounds such as 4,4'-diisocyanatodiphenylmethane, 4,4'-diisocyanatodiphenylether, naphthylene-1,5-diisocyanate, p-phenylenediisocyante, 4,4'-diisocyanato-diphenyl-dimethylmethane, analogous hydroaromatic diisocyanates such as 4,4'-diisocyanato-dicyclohexylmethane and aliphatic diisocyanates containing 2 to 12 carbon atoms such as hexamethylenediisocyanate and isomeric trimethyl-hexamethylene diisocyanates, and diisocyanates derived from isophorone, and mixtures of these diisocyanates.

Instead of using isocyanates, the process may be carried out using compounds which react like isocyanates under the reaction conditions, preferably the addition compounds of alcohols, phenols and lactams, e.g. the addition compounds of phenol, commerical cresol mixtures and caprolactam or of mixtures of the amines corresponding to the isocyanates and aliphatic and aromatic carbonic acid esters, e.g. carbonic acid diethylester, carbonic acid diphenylester or ethylene carbonate, which mixtures may already have partly reacted together, or polycarbodiimides and isocyanato-isocyanurates of the polyisocyanates described.

Monofunctional isocyanates such as phenyl isocyanate, tolyl isocyanate, cyclohexyl isocyanate, stearyl isocyanate, ω,ω,ω-trifluoroethyl isocyanate and 3,5-trifluoromethylphenyl isocyanate and the corresponding amines may also be used to regulate the molecular weight.

Cyclic polycarboxylic acid anhydrides of the kind described in DE-OS Nos. 170 202 and 2 542 706 may be used for the preparation of the polyamidimides used according to the invention, preferably polycarboxylic acid anhydrides corresponding to formula (I)

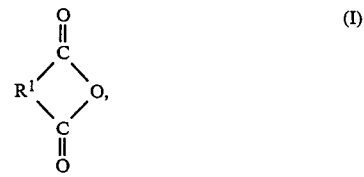

wherein

R$^1$ represents an optionally substituted aliphatic C$_2$–C$_{20}$-group or cycloaliphatic C$_5$–C$_{10}$-group, an aliphatic-aromatic group having 1 to 10 carbon atoms in the aliphatic moiety and 6 to 10 carbon atoms in the aromatic moiety or an aromatic group having 6 to 10 carbon atoms and containing a carboxyl group or at least one other cyclic anhydride group in addition to the cyclic anhydride group already present.

The following are examples: Butane tetracarboxylic acid dianhydride, cyclopentane tetracarboxylic acid dianhydride, pyromellitic acid trianhydride, benzophenone tetracarboxylic acid dianhydride and trimellitic acid anhydride, the latter being particularly preferred.

Instead of using carboxylic acid anhydrides, the process may be carried out using derivatives such as the alkyl esters or phenyl esters or the polycarboxylic acids themselves, which are converted into the acid anhydrides in the course of the reaction.

Carboxylic acids which are monofunctional under the reaction conditions are used to regulate the molecular weight, e.g. phthalic acid or its anhydride, benzoic acid or palmitic acid. These compounds may in turn be substituted with alkyl or with halogen such as fluorine or chlorine.

Lactams are used for preparing the polyamidimides used according to the invention, for example, lactams corresponding to formula (II)

wherein
x represents an integer from 2 to 20.

Caprolactam is the lactam preferably used.

Polyamides such as those described in DAS No. 1 956 512 may be used instead of or in combination with the lactams, e.g. polycapronamide (Nylon 6), polydodecanoic acid amide and polyamides of dicarboxylic acids such as adipic acid, sebacid acid, oxalic acid, dibutylmalonic acid, isophthalic acid and terephthalic acid with diamines such as ethylene diamine, hexamethylene diamine, decamethylene diamines and m- and p-phenylene diamine. Polycapronamide (Nylon 6) and polyhexamethylene adipamide (Nylon 66) are preferably used.

Preparation of the polyamidimides used according to the invention may be carried out in solvents, as described in DE-AS No. 1 770 202. The solvents used are preferably phenols such as phenol itself and commercial mixtures of o-, m- and p-cresols, lactams such as caprolactam or N-methylcaprolactam, butyrolactone or tetramethylene sulphone.

To prepare the polyamidimides used according to the invention, the reactants are kept at temperatures of 0° C. to 400° C. for a few minutes or up to several hours, with or without solvent. The progress of the reaction may be ascertained, for example, from the evolution of gas, the rise in viscosity and the IR spectra.

Polyamidimides according to the invention having a relative viscosity of from 1.5 to 3.0 mPas, preferably from 1.7 to 2.6 mPas, determined on a 1% solution in cresol at 25° C., having proved to be particularly suitable.

It is sometimes advantageous to carry out the reaction for the process of preparation in several stages or to add the individual components in a different sequence or at different temperatures. Thus the polymers may be prepared in a phenolic solvent and then precipitated from solution with a non-solvent, e.g. methanol, and then optionally after-condensed in an extruder.

According to a preferred embodiment of the process, the polymers are prepared in a solvent and then optionally concentrated to a fluid solution or pourable resin while still in the reaction vessel, the remaining concentration process being then carried out in an evaporation extruder at temperatures from 240° to 400° C., preferably 280° to 340° C., optionally under vacuum and optionally with after-condensation.

One Val of carboxylic acid or cyclic carboxylic acid anhydride is generally reacted per Val of isocyanate and 0.5 to 2 Val of lactam or amide are reacted per Val of carboxylic acid anhydride, but the proportions used may differ widely from these ranges.

According to another possible method of carrying out the process, excess isocyanate is reacted with di- or tricarboxylic acids such as adipic acid, terephthalic acid, isophthalic acid or trimesic acid, and excess carboxylic acid is reacted with polyfunctional alcohols such as ethylene glycol, neopentyl glycol, hexanediol, trimethylol propane, tris-hydroxyethyl-isocyanurate, tris-hydroxyethylurazole or polyesters with terminal hydroxyl groups.

The process of preparation of the polymers according to the invention may be influenced by catalysts, e.g. by amines such triethylamine, 1,4-diazabicyclo-(2,2,2)-octane, N-ethyl-morpholine, N-methyl-imidazole and 2-methyl-imidazole, inorganic or organic metal compounds, in particular compounds or iron, lead, zinc, tin, copper, cobalt, or titanium, such as iron(III) chloride, cobalt acetate, lead oxide, lead acetate, tin octoate, dibutyl tin dilaurate, copper acetyl acetonate or titanium tetrabutylate, alkali metal phenolates, sodium cyanide and phosphorus compounds such as trialkylphosphine and methyl phospholine oxide.

Preparation of the alloys according to the invention may be carried out, for example, by introducing the solid polyamidimides described above and the polyamides in solid form into an extruder and then mixing them in the solvent-free, molten state or by mixing the solutions of the components and then evaporating in an extruder or precipitating the product with a suitable precipitating agent, e.g. methanol. According to a preferred embodiment of the process, the polyamide is mixed with the solution or melt obtained from the preparation of the amidimide and the resulting mixture is then evaporated in an evaporation extruder at temperatures from 240° to 400° C., preferably 280° to 340° C., optionally under vacuum and optionally with after-condensation.

The mixtures according to the invention may be used, for example, as thermoplasts and are distinguished by their exceptional tensile strength, E-moduli and dimensional stability under heat. Their properties can be varied for different fields of application by varying the quantitative proportions and the degree of condensation and by adding low molecular weight or high molecular weight components such as fillers, pigments, age resistors, lubricants, plasticizers or other polymers.

EXAMPLES

Example 1

1557 g of 4,4'-Diisocyanatodiphenylmethane, 16.7 g of phenylisocyanate, 121.8 g of a mixture of 80% of 2,4- and 20% of 2,6-tolylene diisocyanate and 1344 g of trimellitic acid anhydride are introduced into a solution of 791 g of caprolactam in 2630 g of a mixture of equal parts of phenol and a mixture of cresols at 120° C. at a rate adjusted to the exothermic reaction. The reaction mixture is then stirred for 2 hours at 170° C., 2 hours at 190° C. and 4 hours at 200° C. Condensation takes place with liberation of carbon dioxide. 1560 g of the solvent are then distilled off under a light vacuum and the residue is kept at 215° C. for a further 2 hours. 129 g of Polyamide-6 (Durethan BK 31 ®) of Bayer AG) are then introduced and stirred into the melt. The polyamidimide/polyamide is obtained on cooling as a brittle, brown resin, which is then crushed up in a beater mill. The solids content is about 76% by weight, the viscosity $\eta_D{}^{25}$ of a 15% solution in cresol is 710 mPas.

The resin prepared as described above is concentrated in a ZSK 32 two-shaft evaporation extruder at a maximum jacket temperature of 330° C. and a pressure of 30 mbar. A transparent, elastic resin which can be worked up by injection moulding is obtained. The relative viscosity $\eta$, determined on a 1% solution in cresol at 25° C., is 2.12.

Example 2

Preparation of the imide resin is carried out as in Example 1. 193 g of hexamethylene adipamide (Nylon 66) are added as polyamide. The mixture is obtained as a brittle resin with a solids content of about 76% by weight and a viscosity, determined on a 15% solution in cresol, of $\eta^{25}=730$ mPas.

A sample of the resin is concentrated by evaporation in a stream of nitrogen, initially at 250° C. and then at 300° C. A fusible, elastic brown resin having a relative viscosity of $\eta^{25}=1.98$ determined on a 1% solution in cresol is obtained.

Example 3

33.9 g of Polycapronamide (Nylon 6) are dissolved in 200 g of phenol/cresol (1:1). 100 g of 4,4'-diisocyanatodiphenylmethane, 17.4 g of 2,4-tolylene diisocyanate and 96 g of trimellitic acid anhydride are then introduced at 120° C. The reaction mixture is stirred for 2 hours at 170° C., 4 hours at 190° C. and 6 hours at 205° C. 130 g of the solvent mixture are then distilled off and the residue is kept at 215° C. for 4 hours, and 6.1 g of polyhexamethylene adipamide (Nylon 66) are then stirred in. A brittle resin having a solids content of about 75% by weight is obtained. The viscosity $\eta^{25}$ of a 15% solution in cresol is 830 mPas.

A sample of the mixture prepared as described above is concentrated by evaporation in a stream of nitrogen, first at 250° C., then at 300° C.

An elastic, yellowish brown resin having a relative viscosity of $\eta^{25}=1.94$ is obtained.

Example 4

17.4 g of a commercial mixture of 80% of 2,4- and 20% of 2,6-tolylene diisocyanate, 225 g of 4,4'-diisocycanatodiphenylmethane and 192 g of trimellitic acid anhydride are introduced into a solution of 113 g of caprolactam in 380 g of cresol/phenol (1:1) at 120° to 130° C. The reaction mixture is then heated to 190° C. according to the rate at which gas is evolved, and the mixture is then stirred for 2 hours at 190° C. and for 4 hours at 205° C. 220 g of the solvent mixture are then distilled off under a light vacuum and the residue is heated to 215° C. for 2 hours and 13.8 g of polyhexamethylene isophthalamide are stirred in. The amidimide mixture is obtained on cooling as a brittle resin having a solids content of about 75% by weight. The viscosity of a 15% solution in cresol is $\eta^{25}=1020$ mPas.

A sample of the mixture prepared as described above is concentrated by evaporation in a stream of nitrogen at 250° C. and then at 300° C. to yield a clear, elastic resin. The relative viscosity is $\eta^{25}=2.03$.

Example 5

Preparation of the imide resin is carried out as in Example 4. 4.6 g of polyhexamethylene adipamide (Nylon 66) as the polyamide component are stirred into the melt until the mixture is dissolved. 1480 g of cresol are then added for dilution to a solids content of about 20% by weight. This solution is stirred into methanol to precipitate a yellow powder which is dried and then fused at 300° C. under nitrogen to form a yellowish brown, elastic resin. The relative viscosity is $\eta^{25}=1.74$ determined on a 1% solution in cresol.

Example 6

40 Parts by weight of polyamidimide prepared according to Example 1 and 60 parts by weight of Polyamide 6 (Durethan B 40F) are introduced separately into a double screw extruder (Werner and Pfleiderer ZSK 32) in which the cylinder and nozzle are heated to 270° C. and the screws rotate at 100 revs/min. When the melt has been homogenized in the extruder, it is ejected as a circular strand which is granulated when cold.

Parts obtained from this granulate by injection moulding at 270° C. only absorb 1.8% by weight of water in air at normal atmospheric humidity (50% r.h.) at 23° C. whereas injection moulded parts obtained from pure Polyamide 6 absorb 2.8% by weight of water.

Example 7

40 parts by weight of polyamidimide prepared according to Example 1 and 60 parts by weight of Polyamide 66 (Durethan A 30) are introduced separately into a double screw extruder (Werner and Pfleiderer ZSK 32) in which the cylinder and nozzle are heated to 280° C. and the screws rotate at 100 revs/min. After being homogenized in the extruder, the melt is extruded as circular strand which is granulated when cold.

Test samples obtained from this granulate by injection moulding at 280° C. were found to have a heat deflection temperature (temperature at which a rod measuring 120×10×4 mm bends through 6 mm under a bending load of 1.8 kg) of 95° C. whereas the heat deflection temperature of Durethan A 30 is only 70° C.

We claim:

1. A thermoplastic injection-moldable composition comprising 10 to 99.8%, by weight of the composition, of a polyamidimide condensation product, prepared at a temperature of from 0° to 400° C., from a mixture consisting essentially of a diisocyanate, a polycarboxylic acid anhydride and a lactam or a first polyamide, where the diisocyanate is a diisocyanate derived from isophorone; toluene diisocyanate; m-phenylenediisocyanate; 4,4'-diisocyanatodiphenylmethane; 4,4'-diisocyanatodiphenylether; naphthylene-1,5-diisocyanate; p-phenylenediisocyanate; 4,4'-diisocyanato-diphenyl-dimethylmethane; 4,4'-diisocyanatodicyclohexylmethane; an aliphatic diisocyanate containing two to twelve carbon atoms or mixtures thereof and 0.2 to 90%, by weight of the composition, of a second polyamide.

2. A thermoplastic injection-moldable composition according to claim 1, wherein the polyamidimide condensation product is present in an amount of from 92 to 99.8%, by weight of the composition, and the second polyamide is present in the amount of from 0.2 to 8%, by weight of the composition.

3. A thermoplastic injection-moldable composition according to claim 1, wherein the polycarboxylic acid anhydride is a trimellitic acid anhydride.

4. A thermoplastic injection-moldable composition according to claim 1 wherein the polyamidimide condensation product is prepared in a solvent for the polyamidimide condensation product.

5. A thermoplastic injection-moldable composition in accordance with claim 1 prepared by introducing the polyamidimide in the solid state and the second polyamide in the solid state in an extruder and then mixing in a solvent-free molten state.

6. A thermoplastic injection-moldable composition in accordance with claim 1 prepared by first mixing a solution of the polyamidimide with a solution of the second polyamide in an extruder and then evaporating the solvent in the extruder or precipitating the molding composition with a precipitating agent.

7. A thermoplastic injection-moldable composition in accordance with claim 6, wherein the evaporation occurs in the extruder at a temperature from 240° to 400° C.

8. A thermoplastic injection-moldable composition in accordance with claim 6, wherein the evaporation occurs in the extruder at a temperature from 280° to 340° C.

9. A thermoplastic injection-moldable composition in accordance with claim 6, wherein the evaporation occurs under vacuum.

10. A thermoplastic injection-moldable composition in accordance with claim 6, wherein the composition is after-condensed.

11. A method for preparing the thermoplastic injection-moldable composition in accordance with claim 1 by first introducing the polyamidimide in a solid state and a second polyamide in a solid state in an extruder and then mixing in a solvent-free molten state.

12. A method for preparing a thermoplastic injection-moldable composition in accordance with claim 1 by first mixing a solution of the polyamidimide with a solution of a second polyamide in an extruder, then evaporating the solvent in the extruder or precipitating the molding composition with a precipitating agent.

13. A method in accordance with claim 12, wherein the evaporation occurs in the extruder at a temperature from 240° to 400° C.

14. A method in accordance with claim 12, wherein the evaporation occurs in the extruder at a temperature from 280° to 340° C.

15. A method in accordance with claim 12, wherein the evaporation occurs under vacuum.

16. A method in accordance with claims 11, wherein the composition is after-condensed.

17. In an improved method for forming molding parts from a thermoplastic molding material, the improvement which comprises using the thermoplastic injection-moldable composition recited in claim 1 as the molding material.

18. In an improved method for forming molding parts from a thermoplastic molding material, the improvement which comprises using the thermoplastic injection-moldable composition recited in claim 2 as the molding material.

19. In an improved method for forming molding parts from a thermoplastic molding material, the improvement which comprises using the thermoplastic injection-moldable molding composition recited in claim 3 as the molding material.

* * * * *